(12) United States Patent
Werner et al.

(10) Patent No.: US 7,262,264 B2
(45) Date of Patent: Aug. 28, 2007

(54) HALOGENATED THIOPHENE MONOMER FOR THE PREPARATION OF REGIOREGULAR POLYTHIOPHENES

(75) Inventors: Christian Werner, Hannover (DE); Andreas Kanschik-Conradsen, Garbsen (DE); Bernd Kellermeier, Lindhorst (DE); Wolfgang Gennburg, Burgdorf (DE); Susanne Hoyer, Gehrden (DE)

(73) Assignee: Honeywell International Inc., Morristown, NJ (US)

( * ) Notice: Subject to any disclaimer, the term of this patent is extended or adjusted under 35 U.S.C. 154(b) by 109 days.

(21) Appl. No.: 11/033,574

(22) Filed: Jan. 12, 2005

(65) Prior Publication Data

US 2006/0155105 A1 Jul. 13, 2006

(51) Int. Cl.
C08G 75/00 (2006.01)
(52) U.S. Cl. ................................ 528/377; 528/379
(58) Field of Classification Search ................ None
See application file for complete search history.

(56) References Cited

U.S. PATENT DOCUMENTS

| | | | | |
|---|---|---|---|---|
| 4,508,639 A | 4/1985 | Camps et al. | ............... | 252/500 |
| 4,711,742 A | 12/1987 | Jen et al. | ................... | 252/500 |
| 4,737,557 A | 4/1988 | Sato et al. | .................. | 526/256 |
| 5,358,546 A | 10/1994 | Rieke | ........................... | 75/252 |
| 5,540,999 A | 7/1996 | Yamamoto et al. | ...... | 428/411.1 |
| 6,166,172 A | 12/2000 | McCullough et al. | ....... | 528/380 |
| 2005/0080219 A1 | 4/2005 | Koller et al. | .................. | 528/73 |

FOREIGN PATENT DOCUMENTS

| EP | 1 028 136 | 8/2000 |
|---|---|---|
| WO | WO 2005/014691 | 2/2005 |

OTHER PUBLICATIONS

"Integrated Optoelectronic Devices Based on Conjugated Polymers" authored by Sirringhaus et al and published in Science (1998) 280, 1741-44.*

"Soluble and Processable Regioregular Poly(3-hexylthiophene) for Thin Film Field Transistor Applications with High Mobility" authored by Bao et al. and published in Appl. Phys Lett. (1996), 69 (26), 4108-4110.*

A. Zen et al., "Effect of Molecular Weight and Annealing of Poly(3-hexylthiophene)s on the Performance of Organic Field-Effect Transistors", *Adv. Funct. Mater.*, Aug. 2004, 14, No. 8, pp. 757-764.

Yamamoto et al.; "Preparation of Thermostable and Electric-Conducting Poly(2,5,-Thienylene)", *Journal of Polymer Science, Polymer Letters Ed.*, vol. 18, 1980, pp. 9-12.

Loewe et al.; "Regioregular, Head-to-Tail Coupled Poly(3-alkylthiophenes) Made Easy by the GRIM Method: Investigation of the Reaction and the Origin of Regioselectivity", *Macromolecules*, 2001, 34, p. 4324-4333.

Yamamoto et al.; "Preparation of π-Conjugated Poly(thiophene-2,5-diyl), Poly(p-phenylene), and Related Polymers Using Zerovalent Nickel Complexes. Linear Structure and Properties of the π-Conjugated Polymers", *Macromolecules*, 1992, 25, p. 1214-1223.

Mao et al.; "Synthesis and Structure-Property Relationships of Regioregular Poly(3-hexylthiophenes)", *Macromolecules*, 1993, 26, p. 1163-1169.

Elsenbaumer et al., "Processible, Environmentally Stable, Highly Conductive Forms of Polythiophene". *Synthetic Metals*. 18, 1987, p. 277-282.

Yokoyama, Akihiro et al "Chain-Growth Polymerization for Poly (3-hexylthiophene) with a Defined Molecular Weight and a Low Polydispersity" dated 2004, pp. 1169-1171 XP002380438.

* cited by examiner

*Primary Examiner*—Marc S. Zimmer
(74) *Attorney, Agent, or Firm*—Erika S. Wilson

(57) ABSTRACT

Conductive polymers and a method of forming conductive polymers. More particularly, a method of forming head-to-tail coupled regioregular poly-(3-substituted) thiophenes having improved charge carrier mobility and current modulation. Also, monomers having two different halogen leaving groups and which form regioregular poly-(3-substituted) thiophenes more efficiently and economically than other processes. Polythiophene polymers, films and articles are also provided.

23 Claims, No Drawings

HALOGENATED THIOPHENE MONOMER FOR THE PREPARATION OF REGIOREGULAR POLYTHIOPHENES

BACKGROUND OF THE INVENTION

1. Field of the Invention

The invention relates to a method of forming conductive polymers. More particularly, the invention pertains to a method of forming head-to-tail coupled regioregular (rr) poly-(3-substituted) thiophenes. The invention also provides monomers suitable for the formation of regioregular poly-(3-substituted) thiophenes, regioregular substituted polythiophenes, as well as films and articles formed therefrom.

2. Description of the Related Art

As is well known, various materials can conduct electricity in different ways. For instance, metals conduct electricity by the movement of free electrons that are not tightly bound to any single atom. In semiconductors, like those that make up transistors and other electronic devices, electricity is produced by the drift of excess electrons that form a negative current, or alternatively the drift of missing electrons or positive "holes" in the opposite direction to form a positive current. Typically, these excess electrons or holes are donated by impurities or dopant atoms.

In the 1970s, it was discovered that polymers can be made to conduct electricity like metallic conductors and semiconductors. At the time, plastics were considered non-conductors, but it was discovered that adding impurities to a polymer material could increase its conductivity by more than a billion times. Today, the field of conducting polymers has been greatly expanded to a broad field of commercial applications.

Conducting polymers are finding increased use compared to other conductive materials because they are lightweight, highly processable and have good mechanical properties. Potential applications for conducting polymers include field-effect transistors, sensors, capacitor coatings, battery electrodes, light-emitting diodes, nonlinear optical materials, molecular wires and molecular switches. Among polymers that have shown conductive properties, polythiophenes are particularly desirable because of their excellent conductivity and processability. Of particular interest in the art are poly(3-alkylthiophenes) (P3ATs), including poly(3-hexylthiophene) (P3HT), which are attractive conductive polymer materials for many potential commercial applications because the alkyl side chains offer improved solubility in many common organic solvents, particularly ethers. Today, poly(3-alkylthiophenes) are widely used as hole-transporting materials in organic field-effect transistors.

To those skilled in the art of conductive polythiophene polymers, it is well known that the degree of conductivity exhibited by conductive polymers depends on their degree of order on a molecular level. This is due in part to a crystal lattice structure that allows an overlapping pathway for electrons. To illustrate, the conductivity of poly-(3-substituted thiophenes) is known to increase with the degree of regioregularity. Because of its asymmetrical structure, the polymerization of 3-substituted thiophene produces a mixture of polythiophene structures containing three possible regiochemical linkages between repeat units depending on the specific synthesis procedure. The three orientations available when two thiophene rings are joined are the 2,2', 2,5', and 5,5' couplings. When application as a conducting polymer is desired, the 2,2' (or head-to-head) coupling and the 5,5' (or tail-to-tail) coupling, referred to as regiorandom couplings, are considered to be defects in the polymer structure because they cause a sterically driven twist of thiophene rings that disrupt conjugation, produce an amorphous structure, and prevent ideal solid state packing, thus diminishing electronic and photonic properties. The steric crowding of solubilizing groups in the 3 position leads to loss of planarity and less π overlap. In contrast, the 2,5' (or head-to-tail (HT) coupled) regioregular polythiophenes can access a low energy planar conformation, leading to highly conjugated polymers that provide flat, stacking macromolecular structures that can self-assemble, providing efficient interchain and intrachain conductivity pathways. The electronic and photonic properties of the regioregular materials are maximized.

Various methods have been employed to synthesize 2,5' regioregular polythiophenes. Two of the more commonly known methods are the "McCullough method", described in U.S. Pat. No. 6,166,172 by Richard D. McCullough and Robert S. Loewe of Carnegie Mellon University, and the "Rieke method", described in U.S. Pat. No. 5,358,546 by Reuben D. Rieke of the University of Nebraska. The McCullough method region-specifically generates 2-bromo-5-(bromomagnesio)-3-alkylthiophene from a monomer which is polymerized with catalytic amounts of 1,3-diphenylphosphinopropane nickel(II) chloride (Ni(dppp)Cl$_2$) using Kumada cross-coupling methods. The Rieke method differs from the McCullough method primarily in the synthesis of an asymmetric organometallic intermediate. Rieke describes adding a 2,5-dibromo-3-alkylthiophene to a solution of highly reactive "Rieke zinc" to form a mixture of the isomers, 2-bromo-3-alkyl-5-(bromozincio) thiophene and 2-(bromozincio)-3-alkyl-5-bromothiophene. The addition of 1,2-bis(diphenylphosphino)ethane nickel(II) chloride (Ni(dppe)Cl$_2$), a nickel cross-coupling catalyst, leads to the formation of regioregular HT-poly(3-alkylthiophenes). Each of these methods produce polythiophenes with a high percentage of HT couplings, in the range of 90% or higher. A detailed description of both the McCullough method and the Rieke method, as well as other methods, are illustrated in detail in U.S. Pat. No. 6,166,172.

Despite the efforts by those skilled in the art to improve HT coupling techniques, the synthetic procedures heretofore described have significant drawbacks. For example, the McCullough method requires highly purified starting materials, the most important of which is the monomer, 2-bromo-3-alkylthiophene. The need for purity adds to the cost of the synthesis. The Rieke method includes an easily purified 2,5-dibromo-3-alkylthiophene as a starting material, but requires the difficult preparation of Rieke zinc via alkali metal reduction of zinc halides in an inert environment. Accordingly, a new method for the preparation of regioregular, HT-poly-(3-alkylthiophenes) is needed that is efficient and economical. It has been unexpectedly found that poly(3-substituted) thiophenes formed with a thiophene monomer having two different halogen leaving groups will result in a thiophene polymer having superior conductive properties and at a higher yield and lower cost than other known processes. Additionally, poly(3-substituted) thiophenes of the invention have been found to have improved charge carrier mobility and current modulation (on/off ratio) properties compared to polythiophenes formed via prior art processes.

SUMMARY OF THE INVENTION

The invention provides a method of forming a substituted polythiophene, comprising:

a) providing a solvent soluble, substituted thiophene monomer, wherein said monomer has the structure:

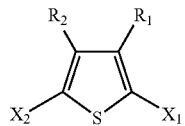

wherein $X_1$ and $X_2$ are different and each comprises a halogen atom, with at least one of the halogen atoms being capable of bonding with magnesium; $R_1$ comprises a $C_1$ to $C_{20}$ alkyl group, a $C_1$ to $C_{20}$ F-alkyl group, a $C_1$ to $C_{20}$ O-alkyl group, a $C_1$ to $C_{20}$ S-alkyl group, a $C_6$ to $C_{20}$ aryl group, fluorine or $NO_2$; $R_2$ comprises hydrogen, fluorine, $NO_2$ or a $C_1$ to $C_{20}$ alkyl group, a $C_1$ to $C_{20}$ F-alkyl group, a $C_1$ to $C_{20}$ O-alkyl group, a $C_1$ to $C_{20}$ S-alkyl group or a $C_6$ to $C_{20}$ aryl group;

b) combining the substituted thiophene monomer with magnesium and a solvent to form a regiochemical intermediate; and c) reacting the regiochemical intermediate with a polymerization catalyst under conditions sufficient to polymerize the intermediate producing a regioregular, substituted polythiophene reaction product having repeating units of the structure:

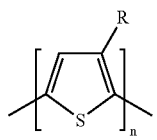

wherein R comprises either a $C_1$ to $C_{20}$ alkyl group, a $C_1$ to $C_{20}$ F-alkyl group, a $C_1$ to $C_{20}$ O-alkyl group, a $C_1$ to $C_{20}$ S-alkyl group or a $C_6$ to $C_{20}$ aryl group, fluorine or $NO_2$; the polymer having a charge carrier mobility ($\mu$) of at least about $1 \times 10^{-2}$ cm$^2$/Vs and an on/off ratio of at least about $1 \times 10^3$, and wherein n comprises from about 2 to about 10,000.

The invention also provides a compound having the structure:

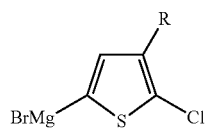

or,

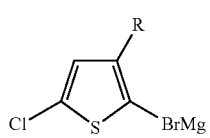

wherein R comprises a $C_1$ to $C_{20}$ alkyl group, a $C_1$ to $C_{20}$ F-alkyl group, a $C_1$ to $C_{20}$ O-alkyl group, a $C_1$ to $C_{20}$ S-alkyl group, a $C_6$ to $C_{20}$ aryl group, fluorine or $NO_2$, and wherein n comprises from about 2 to about 10,000.

The invention further provides a regioregular polythiophene polymer having repeating units of the structure:

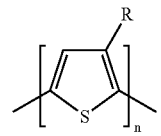

wherein R comprises either a $C_1$ to $C_{20}$ alkyl group, a $C_1$ to $C_{20}$ F-alkyl group, a $C_1$ to $C_{20}$ O-alkyl group, a $C_1$ to $C_{20}$ S-alkyl group or a $C_6$ to $C_{20}$ aryl group, fluorine or $NO_2$; the polymer having a charge carrier mobility ($\mu$) of at least about $1 \times 10^{-2}$ cm$^2$/Vs and an on/off ratio of at least about $1 \times 10^3$, and wherein n comprises from about 2 to about 10,000.

The invention still further provides a film formed from a regioregular, substituted polythiophene, which film is formed by:

I. forming a regioregular, substituted polythiophene by:

a) providing a solvent soluble, substituted thiophene monomer, wherein said monomer has the structure:

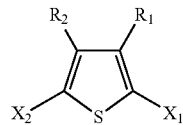

wherein $X_1$ and $X_2$ are different and each comprises a halogen atom, with at least one of the halogen atoms being capable of bonding with magnesium; $R_1$ comprises a $C_1$ to $C_{20}$ alkyl group, a $C_1$ to $C_{20}$ F-alkyl group, a $C_1$ to $C_{20}$ O-alkyl group, a $C_1$ to $C_{20}$ S-alkyl group or a $C_6$ to $C_{20}$ aryl group, fluorine or $NO_2$; $R_2$ comprises hydrogen, fluorine, $NO_2$ or a $C_1$ to $C_{20}$ alkyl group, a $C_1$ to $C_{20}$ F-alkyl group, a $C_1$ to $C_{20}$ O-alkyl group, a $C_1$ to $C_{20}$ S-alkyl group or a $C_6$ to $C_{20}$ aryl group;

b) combining the substituted thiophene monomer with magnesium and a solvent to form a regiochemical intermediate; and c) reacting the regiochemical intermediate with a polymerization catalyst under conditions sufficient to polymerize the intermediate producing a substituted polythiophene reaction product; the polythiophene having a regioregularity of at least about 90%, a charge carrier mobility ($\mu$) of at least about $1 \times 10^{-2}$ cm$^2$/Vs and an on/off ratio of at least about $1 \times 10^3$; and II. forming the regioregular, substituted polythiophene of (I) into a film.

DETAILED DESCRIPTION OF THE INVENTION

The invention provides a method for producing regioregular poly(3-substituted) thiophenes from a solvent soluble, substituted thiophene monomer, wherein said monomer has the structure:

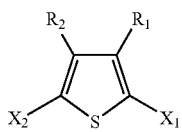

wherein $X_1$ and $X_2$ are different and each comprises a halogen atom, with at least one of the halogen atoms being capable of bonding with magnesium; $R_1$ comprises an alkyl group having at least one carbon atom, and preferably comprises a $C_1$ to $C_{20}$ alkyl group, a $C_1$ to $C_{20}$ fluorine substituted alkyl group (F-alkyl group), a $C_1$ to $C_{20}$ oxygen substituted alkyl group (O-alkyl group), a $C_1$ to $C_{20}$ sulfur substituted alkyl group (S-alkyl group), a $C_6$ to $C_{20}$ aryl group, fluorine or $NO_2$; $R_2$ comprises hydrogen, fluorine, $NO_2$ or a $C_1$ to $C_{20}$ alkyl group, a $C_1$ to $C_{20}$ O-alkyl group, a $C_1$ to $C_{20}$ S-alkyl group, a $C_1$ to $C_{20}$ F-alkyl group or a $C_6$ to $C_{20}$ aryl group. $R_1$ may also comprise hydrogen, but $R_1$ and $R_2$ may not comprise hydrogen at the same time. This substituted thiophene monomer is combined with magnesium metal and a solvent, e.g. an ether, to form a regiochemical intermediate. This regiochemical intermediate is reacted with a polymerization catalyst under conditions sufficient to polymerize the intermediate, producing a regioregular substituted polythiophene reaction product. In the preferred embodiment of the invention, the $R_1$ group comprises a $C_1$ to $C_{20}$ alkyl group. An alkyl group is preferred because they are known to improve the solubility of the thiophene in organic solvents. More preferred are either a hexyl ($C_6$) or decyl ($C_{10}$) group. Most preferably, the $R_1$ group comprises a hexyl group, because superior mobility properties have been found for regioregular polythiophenes substituted with linear hexyl side chains. The $R_1$ group must comprise a group that is non-reactive with the organomagnesium Grignard reagent or otherwise must be protected from reacting with either the Grignard reagent or polymerization catalyst, as is well known in the art. In the preferred embodiment of the invention the $R_2$ group comprises hydrogen. Importantly, if the $R_2$ group is substituted, such as with an alkyl group, then $R_1$ must be hydrogen in order to have a regioregular polythiophene. Thus, if the $R_1$ group is substituted then $R_2$ must be hydrogen in order to have a regioregular polythiophene Also, $X_1$ and $X_2$ preferably bromine and chlorine, or vice-versa, although other halogens, such as iodine, are also acceptable. It is also within the scope of the invention for either $R_1$ or $R_2$ to comprise an alkyl, aryl or substituted-alkyl group having greater than $C_{20}$ (e.g. $C_{50}$ or above).

Particularly superior results have been achieved using a starting thiophene monomer wherein $R_1$ is a hexyl group, $R_2$ is hydrogen, and $X_1$ and $X_2$ are either chlorine or bromine. Accordingly, regioregular poly(substituted) thiophenes having excellent properties have been produced wherein the starting thiophene monomer comprises either 2-bromo-5-chloro-hexylthiophene or 5-bromo-2-chloro-hexylthiophene, or 2-bromo-5-chloro-4-hexylthiophene or 5-bromo-2-chloro-4-hexylthiophene.

The soluble thiophene monomer is combined with magnesium metal at a monomer:magnesium ratio of about 0.8:1.2, more preferably about 0.9:1.1 and most preferably in an equimolar 1:1 ratio. The two are combined in the presence of an organic solvent. The preferred solvent is a non-reactive dry (anhydrous) ether, ethylether, diethylether or dry tetrahydrofuran (THF) solvent. Non-reactive, anhydrous or "dry" solvents are typically necessary because Grignard reagents are highly reactive with water. In a more preferred embodiment, the solvent is dry methyl-THF, e.g. 2-methyl-THF. 2-Methyl-THF is preferred because it has been found as the most successful solvent for reducing or eliminating the formation of interfering reaction side-products, and allows for the use of higher concentrations of both the Grignard reagent and the catalyst. In the preferred embodiment of the invention, the thiophene monomer is present in a concentration in the solvent of about 0.1 mol/L to about 2 mol/L, more preferably about 0.25 mol/L to 1 mol/L, and most preferably about 0.5 mol/L to 0.7 mol/L.

To assist in the initiation of a reaction between the magnesium metal and the thiophene monomer, a catalytic amount of the organomagnesium Grignard reagent is preferably added to the reaction mixture. For the purposes of the invention, a catalytic amount comprises from about 0.1 to about 20.0 mol % of the Grignard reagent, more preferably from about 0.1 to about 10.0 mol % and most preferably from about 1 to about 5 mol %. The organomagnesium Grignard reagent (R'MgX') may generally be any alkylmagnesiumhalide or arylmagnesiumhalide Grignard reagent as is known by those skilled in the art. X' may be any halogen, but is typically Br, Cl or I, and R' may comprise an alkyl group having at least one carbon atom or an aryl group having at least six carbon atoms, and preferably comprising a $C_1$ to $C_{20}$ alkyl group or $C_6$ to $C_{20}$ aryl group. The formation of Grignard reagents, typically by the reaction of an organic halide with magnesium metal in a non-reactive solvent, are well known in the art. In the preferred embodiment of the invention, the Grignard reagent is prepared using a methyl-tetrahydrofuran solvent, most preferably 2-methyl-THF. Examples of Grignard reagents suitable herein include a variety of substituted and unsubstituted aryl and alkyl Grignard reagents including methyl, ethyl, isopropyl, butyl, sec-butyl, tert-butyl, 2-methoxyphenyl, t-amyl, t-octyl, hexyl, pentyl, and 1-octyl magnesium halides, such as magnesium bromides and magnesium chlorides. Preferred Grignard reagents include tert-butyl magnesium chloride and tert-butyl magnesium bromide. A most preferred Grignard reagent is tert-butyl magnesium chloride. The polymerization reaction is preferably carried out at a reaction temperature of from about −20° C. to about 110° C., more preferably from about 0° C. to about 80° C. and most preferably from about 65° C. to about 75° C. The reaction is preferably carried out for about 5 min to about 24 hours.

The reaction of the thiophene monomer with magnesium metal results in the formation of an intermediate compound which preferably comprises either the structure:

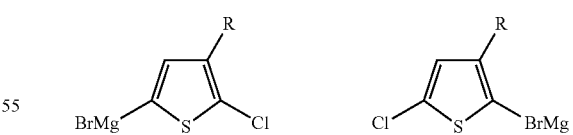

or the structure:

wherein R comprises a $C_1$ to $C_{20}$ alkyl group, a $C_1$ to $C_{20}$ F-alkyl group, a $C_1$ to $C_{20}$ O-alkyl group, a $C_1$ to $C_{20}$ S-alkyl group, a $C_6$ to $C_{20}$ aryl group, fluorine or $NO_2$. The bromine and chlorine groups may also be substituted with other halogen groups, so long as the two are not the same.

Once this intermediate is formed, it is then reacted with a polymerization catalyst in order to polymerize the thiophene and form a regioregular substituted polythiophene reaction product, particularly a poly(3-substituted) thiophene reaction product. The polymerization catalyst preferably comprises a suitable nickel or palladium catalyst. Suitable catalysts non-exclusively include materials selected from the group consisting of Ni (II), Ni (0), Pd(II) and Pd(0) compounds. More particularly, [1,3-bis(diphenylphosphino)propane]dichloronickel(II), nickel (II) acetylacetonate, 1,2-bis(diphenylphosphino)ethane nickel(II) chloride, dichlorobis(triphenylphosphine) palladium (II); complexes of nickel (II) acetylacetonate and tri-tert-butylphosphine, triadamantylphosphine, 1,3-bis(2,4,6-trimethylphenyl)imidazolium chloride, 1,3-bis(2,6-diisopropylphenyl), 1,3-bis(2,6-diisopropylphenyl)imidazolium chloride, 1,3,4-triphenyl-4,5-dihydro-1H-1,2,4-triazol-5-ylidene, 1,3-diadamantyl-imidazolium chloride, 1,3-bis(2,4,6-trimethylphenyl)-imidazolidinium chloride, 1,3-bis(2,6-diisopropylphenyl)-imidazolidinium chloride and suspensions and combinations thereof. Catalyst suspensions are preferably suspended in a Grignard reagent as described in the examples below. In the most preferred embodiment of the invention, the catalyst comprises [1,3-bis(diphenylphosphino)propane]nickel (II) chloride, 1,2-bis(diphenylphosphino)ethane nickel(II) chloride or a 1:1 complex of nickel (II) acetylacetonate and 1,3-bis(2,4,6-trimethylphenyl)imidazolium chloride.

The catalyst may be added in a second step to a container which contains the already formed intermediate, or alternately each of the monomer, magnesium metal, Grignard reagent, solvent and catalyst may be combined in a single step. In the preferred embodiment of the invention, the catalyst is added after the intermediate is formed. The catalyst may be added by itself or in combination with a solvent. Preferably, the catalyst is prepared in the presence of a tetrahydrofuran solvent (e.g. dry THF), more preferably a methyl-tetrahydrofuran solvent, most preferably a 2-methyl-THF solvent. In another alternate embodiment, the polymerization catalyst, may be generated in-situ during the reaction process. For example, a Nickel (0) catalyst may be generated in-situ through the following reaction process:

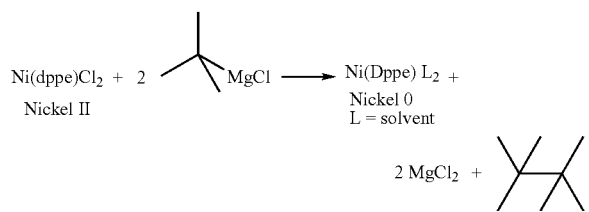

Said catalyst compound preferably comprises a catalyst concentration of from about 1% by weight to about 50 mol % by weight, more preferably 5% by weight to about 20% by weight in the solvent. Alternately, the polymerization catalyst may comprise a combination of a catalyst compound with an organomagnesium Grignard reagent, such as tert-butyl magnesium chloride. In this embodiment, said catalyst compound preferably comprises a catalyst concentration of from about 1% by weight to about 20% by weight, more preferably 5% by weight to about 10% by weight in the Grignard reagent.

In the preferred embodiment of the invention, the catalyst is combined in a catalyst:intermediate monomer mol ratio of from about 0.001 mol % to about 10 mol %, more preferably from about 0.1 to about 1 mol % with the intermediate. The polymerization reaction is preferably carried out at a reaction temperature of from about 20° C. to about 100° C., more preferably from about 50° C. to about 90° C. and most preferably from about 70° C. to about 80° C. The reaction is preferably carried out for about 5 min to about 24 hours. It has been found that the temperature of the above described reactions are very important to achieving the regioregularity of the polythiophene. A reaction temperature of 80° C. in particular has been found to give a high regioregularity.

In the preferred embodiment of the invention, the crude polythiophene product is further treated by reacting it with from about 1 mol % to about 20 mol % of a trialkylphosphite compound, more preferably from about 5 mol % to about 10 mol %, to further refine the final product. Said trialkylphosphite compound may generally comprise any alkyl group having at least one carbon atom, but preferably comprises a $C_1$ to about $C_4$ alkyl group, and most preferably comprises triethylphosphite. Further, the crude material is preferably solidified by the addition of a solvent such as alkanes, acidic acid esters and mixtures thereof at a crude:solvent ratio of about 1:5 to about 1:100. Particularly preferred solvents include ethylacetate, hexane, heptane, dichloromethane and chloroform. The most preferred solvent is ethylacetate.

The resulting regioregular polythiophene has the following structure:

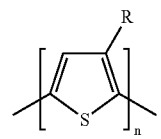

wherein R comprises a $C_1$ to $C_{20}$ alkyl group, a $C_1$ to $C_{20}$ F-alkyl group, a $C_1$ to $C_{20}$ O-alkyl group, a $C_1$ to $C_{20}$ S-alkyl group, a $C_6$ to $C_{20}$ aryl group, fluorine or $NO_2$, and wherein n comprises at least about 2, preferably from about 2 to about 10,000, and more preferably n is from about 2 to about 1000 repeating thiophene units. It is within the scope of the invention that n may comprise even greater than 10,000. While this structure illustrates the R group as being in the 3-position of the thiophene ring, for the purposes of this invention, the structure should be interpreted as having said R group at either the 3-position or the 4-position on the thiophene ring. The bond between adjacent repeating thiophene units is a C-C bond of the thiophene rings, with the 2-position of one thiophene ring connecting with the 5-position of an adjacent thiophene ring to form the desired 2,5' head-to-tail regioregular structure.

As discussed herein, the regioregular poly-(3-substituted) thiophenes formed by the process of the invention have enhanced regioregularity, and hence superior conductivity properties, compared to poly-(3-substituted) thiophenes formed using processes of the related art. The regioregular polythiophenes of the invention have been found to have a regioregularity of greater than about 90%, more preferably about 95% and most preferably have a regioregularity of greater than or equal to about 99%. Additionally, the regioregular polythiophenes formed by the processes of the invention exhibit a higher charge carrier mobility (μ) and on/off ratio (current modulation) than regioregular polythiophenes formed via processes described in the related art. The polymers, films and articles formed from the processes of the invention have a preferred mobility of at least about $1\times10^{-2}$ $cm^2/Vs$ and an on/off ratio of at least about $1\times10^3$. However, these charge carrier mobility and current modulation (on/off ratio) numbers, and those in the examples below, apply to the crude assay of the reaction product and the mobility and on/off ratio of a final product can be significantly increased through treatment, e.g. extraction or heat treatment, to mobility levels of 0.05-0.1 $cm^2/Vs$ or greater and on/off ratios of $1\times10^5$-$1\times10^6$ or greater. Additional treatments (e.g. treatment with solvents) may be conducted after extraction to further improve the conductivity properties of the reaction product.

As described below, for example, in Example 1, a regioregular polythiophene having 93.5% regioregularity is achieved having high mobility characteristics of at least about $3.6\times10^{-2}$ $cm^2/Vs$ with a on/off ratio of $4\times10^3$. In Example 6, a regioregular polythiophene having 93.3% regioregularity is achieved having high mobility characteristics of at least about $3.2\times10^{-2}$ $cm^2/Vs$ with a on/off ratio of $1\times10^5$. Such polymers are capable of forming articles and devices with vastly improved conductivity performance compared to those formed using other techniques, such as those prepared according to U.S. Pat. No. 6,166,172 to McCullough ($\mu$=$9.3\times10^{-3}$ $cm^2/Vs$, on/off ratio=$1\times10^4$) and to commercially available polythiophenes formed using well known Rieke techniques ($\mu$=$1.4\times10^{-3}$ $cm^2/Vs$, on/off ratio=$1\times10^3$). The process of the invention has been found to be particularly desirable for the formation of regioregular poly(3-hexylthiophenes) and regioregular poly(3-decylthiophenes). Overall, the crude assay of the polythiophene reaction products formed from the processes of the invention have improved charge carrier mobility and on/off ratio properties and are formed much more efficiently and economically than any other known prior art process.

The materials of the present invention have been found to be extremely attractive for use as conductive polymers and films useful in the production of conductive articles including electrical and optical devices such as organic field-effect transistors or solar cells. Films and articles may be formed using techniques that are well known in the art. One well known method for forming a film is extrusion. In a typical extrusion process, the polymeric material for each individual film layer is fed into infeed hoppers of one or more extruders, each extruder handling the material for one or more layers. A melted and plasticated polymer stream from individual extruders is fed into a single manifold co-extrusion die. If forming a single layer film, a single layer of polymer material will emerge from the die. If forming a multilayer film, multiple layers are juxtaposed while in the die and combined, then emerge from the die as a single multiple layer film of polymeric material. After exiting the die, the film is cast onto a first controlled temperature casting roll, passes around the first roll, and then onto a second controlled temperature roll, which is normally cooler than the first roll. The controlled temperature rolls largely control the rate of cooling of the film after it exits the die. Additional rolls may be employed. In another method, the film forming apparatus may be one which is referred to in the art as a blown film apparatus and includes a multi-manifold circular die head for bubble blown film through which a plasticized film composition is forced and formed into a film bubble which may ultimately be collapsed and formed into a film. Processes of coextrusion to form film and sheet laminates are generally known. Typical coextrusion techniques are described in U.S. Pat. Nos. 5,139,878 and 4,677,017. The polythiophene materials may also be formed into pellets and stored for future use and/or sale.

The following examples serve to illustrate the invention:

EXAMPLE 1

5-Bromo-2-chloro-3-hexylthiophene (10 g, 0.0355 mol) was added over a period of 30 min to a mixture of 75 ml 2-methyltetrahydrofurane, magnesium (0.86 g, 0.0355 mol) and 0.15 ml of a 1 molar solution of tert-butylmagnesium-chloride solution in THF at a temperature of 60-70° C. The mixture was stirred for an additional 1.5 h at 70° C. At 60° C. a suspension of $Ni(dppe)Cl_2$ (93 mg, 0.177 mmol) in 12.5 ml 2-methyltetrahydrofurane was added to the reaction mixture over a period of 30 min and then the mixture was stirred for additional 3 h at 80° C. Triethylphosphite (0.5 g, 3 mmol) was added to the reaction mixture and the mixture was stirred for additional 30 min at 80° C. Next, trace metals were removed using conventional distillation and filtration techniques. After trace metals were removed, the remaining material was dissolved in 10 ml toluene and added to 100 ml of ethyl acetate, creating a suspension. The suspension was then stirred for 30 min at 80° C., cooled down and filtered off. The residue was washed two times with ethylacetate (2×20 ml) and was dried. The process yielded 4.8 g (81%) poly(3-hexyl)thiophene having a regioregularity of 93.5%. Other properties include the following: Mn=10232, Mw=19543, Tm=224° C., Tmr=188° C., UV ($CHCl_3$: max=450.79 nm; film: 521, 550, 602 nm), charge carrier mobility ($\mu$)=$3.6\times10^{-2}$ $cm^2/Vs$, on/off-ratio=$4\times10^3$.

EXAMPLE 2

5-Bromo-2-chloro-3-hexylthiophene (10 g, 0.0355 mol) was added over a period of 30 min to a mixture of 75 ml 2-methyltetrahydrofurane, magnesium (0.86 g, 0.0355 mol) and 0.15 ml of a 1 molar solution of tert-butylmagnesium-chloride solution in THF at a temperature of 60-70° C. The mixture was stirred for additional 1.5 h at 70° C. At 60° C. a suspension of $Ni(acac)_2$ (45.6 mg, 0.177 mmol), 1,3-bis (2,4,6-trimethylphenyl)imidazolium chloride (121 mg, 0.355 mmol) and tert-butylmagnesiumchloride solution (0.71 ml, 1 m in THF) in 20 ml 2-methyltetrahydrofurane was added to the reaction mixture over a period of 30 min. The reaction mixture was stirred for additional 3 h at 80° C. Triethylphosphite (0.5 g, 3 mmol) was added to the reaction mixture and the mixture was stirred for additional 30 min at 80° C. Trace metals were removed using conventional techniques and a polythiophene product was separated out. The process yielded 2.68 g (45%) poly(3-hexyl)thiophene having a regioregularity of 91.35%. Other properties included: Mn=17523, Mw=55053, Tm=228.66° C., Tmr=187.43° C., UV ($CHCl_3$: max=449.98 nm; film: 522, 554, 603 nm); JSC=16.5 mA/cm2, T=350 K (15.3 mA/cm2 @ 305 K), VOC=550 mV Power Efficiency 3.1% under 1 Sun (100 mW/cm2); charge carrier mobility ($\mu$)=$3.9\times10^{-2}$ $cm^2/Vs$, on/off-ratio=$1\times10^3$.

EXAMPLE 3

5-Bromo-2-chloro-3-hexylthiophene (10 g, 0.0355 mol) was added over a period of 30 min to a mixture of 75 ml 2-methyltetrahydrofurane, magnesium (0.86 g, 0.0355 mol) and 0.15 ml of a 1 molar solution of tert-butylmagnesium-chloride solution in THF at a temperature of 60-70° C. The mixture was stirred for additional 1.5 h at 70° C. At 60° C. a suspension of $Ni(dppp)Cl_2$ (160 mg, 0.355 mmol) and tert-butylmagnesiumchloride solution (1.35 ml, 1 m in THF) in 20 ml 2-methyltetrahydrofurane was added to the reaction mixture over a period of 30 min. The reaction mixture was stirred for additional 3 h at 80° C. Triethylphosphite (0.5 g, 3 mmol) was added to the reaction mixture and the reaction mixture was stirred for additional 30 min at 80° C. Trace metals were removed using conventional techniques and a polythiophene product was separated out. The process yielded 3.28 g (55%) poly(3-hexyl)thiophene having a regioregularity of 91%. Other properties included: Mn=10596, Mw=18303, UV ($CHCl_3$: max=448 nm; film: 523, 553, 606 nm), charge carrier mobility ($\mu$)=$3.2\times10^{-2}$ $cm^2/Vs$, on/off-ratio=$1\times10^4$.

EXAMPLE 4

5-Bromo-2-chloro-3-hexylthiophene (10 g, 0.0355 mol) was added over a period of 30 min to a mixture of 50 ml 2-methyltetrahydrofurane, magnesium (0.86 g, 0.0355 mol) and 0.15 ml of a 1 molar solution of tert-butylmagnesium-chloride solution in THF at a temperature of 60-70° C. The mixture was stirred for additional 1.5 h at 70° C. At 60° C. a suspension of $Ni(acac)_2$ (91 mg, 0.355 mmol), 1,3-bis(2,4,6-trimethylphenyl)imidazolium chloride (125.1 mg, 0.355 mmol) and tert-butylmagnesiumchloride solution (3.54 ml, 1 m in THF) in 20 ml 2-methyltetrahydrofurane was added to the reaction mixture over a period of 30 min. The reaction mixture was stirred for additional 3 h at 80° C. Triethylphosphite (0.5 g, 3 mmol) was added to the reaction mixture and the mixture was stirred for additional 30 min at 80° C. Trace metals were removed using conventional techniques and a polythiophene product was separated out. The process yielded 3.3 g (56%) poly(3-hexyl)thiophene having a regioregularity of 91.14%. Other properties included: Mn=23768, Mw=56963, Tm=299.8° C., Tmr=190.69° C., UV ($CHCl_3$: max=451.82 nm; film: 524, 556, 605 nm), charge carrier mobility ($\mu$)=$2.2\times10^{-2}$ $cm^2$/Vs, on/off-ratio=$3\times10^3$.

EXAMPLE 5

5-Bromo-2-chloro-3-hexylthiophene (10 g, 0.0355 mol) was added over a period of 30 min to a mixture of 50 ml 2-methyltetrahydrofurane, magnesium (0.86 g, 0.0355 mol) and 0.15 ml of a 1 molar solution of tert-butylmagnesium-chloride solution in THF at a temperature of 60-70° C. The mixture was stirred for additional 1.5 h at 70° C. At 60° C. a suspension of $Ni(dppe)Cl_2$ (186 mg, 0.355 mmol) and tert-butylmagnesiumchloride solution (6 ml, 1 m in THF) in 25 ml 2-methyltetrahydrofurane was added to the reaction mixture over a period of 30 min. The reaction mixture was stirred for additional 3 h at 80° C. Triethylphosphite (0.5 g, 3 mmol) was added to the reaction mixture and the mixture was stirred for additional 30 min at 80° C. Trace metals were removed using conventional techniques and a polythiophene product was separated out. The process yielded 3.8 g (64%) poly(3-hexyl)thiophene having a regioregularity of 92.58%. Other properties included: Mn=10100, Mw=24500, Tm=220.5° C., Tmr=183.64° C., UV ($CHCl_3$: max=447.86 nm; film: 516, 553, 606 nm), charge carrier mobility ($\mu$)=$1.8\times10^{-2}$ $cm^2$ Vs, on/off-ratio=$3\times10^5$.

EXAMPLE 6

5-Bromo-2-chloro-3-hexylthiophene (10 g, 0.0355 mol) was added over a period of 30 min to a mixture of 50 ml 2-methyltetrahydrofurane, magnesium (0.86 g, 0.0355 mol) and 0.15 ml of a 1 molar solution of tert-butylmagnesium-chloride solution in THF at a temperature of 60-70° C. The mixture was stirred for additional 1.5 h at 70° C. At 60° C. a suspension of $Ni(acac)_2$ (91 mg, 0.355 mmol), 1,3-bis(2,4,6-trimethylphenyl)imidazolium chloride (125.1 mg, 0.355 mmol) and tert-butylmagnesiumchloride solution (4 ml, 1 m in THF) in 20 ml 2-methyltetrahydrofurane was added to the reaction mixture over a period of 30 min. The reaction mixture was stirred for additional 3 h at 80° C. Triethylphosphite (0.5 g, 3 mmol) was added to the reaction mixture and the mixture was stirred for additional 30 min at 80° C. Trace metals were removed using conventional techniques and a polythiophene product was separated out. The process yielded 1.5 g (25%) poly(3-hexyl)thiophene having a regioregularity of 93.3%. Other properties included: Mn=16861, Mw=33147, Tm=225.5° C., Tmr=195.5° C., UV ($CHCl_3$: max=450.98 nm; film: 551 nm), charge carrier mobility ($\mu$)=$3.2\times10^{-2}$ $cm^2$/Vs, on/off-ratio=$1\times10^5$.

EXAMPLE 7

5-Bromo-2-chloro-3-hexylthiophene (10 g, 0.0355 mol) was added over a period of 30 min to a mixture of 50 ml 2-methyltetrahydrofurane, magnesium (0.86 g, 0.0355 mol) and 0.15 ml of a 1 molar solution of tert-butylmagnesium-chloride solution in THF at a temperature of 60-70° C. The mixture was stirred for additional 1.5 h at 70° C. At 60° C. a suspension of $Ni(dppp)Cl_2$ (190 mg, 0.177 mmol) in 20 ml 2-methyltetrahydrofurane was added to the reaction mixture over a period of 30 min. The reaction mixture was stirred for additional 3 h at 80° C. Trace metals were removed using conventional techniques and a polythiophene product was separated out. The process yielded 4.4 g (75%) poly(3-hexyl)thiophene having a regioregularity of 90%. Other properties included: Mn=7837, Mw=15283, UV ($CHCl_3$: max=448.11 nm; film: 520, 550, 607 nm).

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A method of forming a substituted polythiophene, comprising:

a) providing a solvent soluble, substituted thiophene monomer, wherein said monomer has the structure:

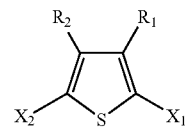

wherein $X_1$ and $X_2$ are different and each comprises a halogen atom, with at least one of the halogen atoms being capable of bonding with magnesium; $R_1$ comprises a $C_1$ to $C_{20}$ alkyl group, a $C_1$ to $C_{20}$ F-alkyl group, a $C_1$ to $C_{20}$ O-alkyl group, a $C_1$ to $C_{20}$ S-alkyl group, a $C_6$ to $C_{20}$ aryl group, fluorine or $NO_2$; and $R_2$ comprises hydrogen;

b) combining the substituted thiophene monomer with magnesium metal and a methyl-tetrahydrofuran solvent to form a regiochemical intermediate; and c) reacting the regiochemical intermediate with a polymerization catalyst under conditions sufficient to polymerize the intermediate producing a regioregular, substituted polythiophene reaction product having repeating units of the structure:

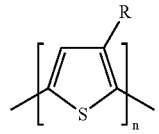

the polymer having a charge carrier mobility (μ) of at least about $1\times10^{-2}$ cm$^2$/Vs and an on/off ratio of at least about $1\times10^3$, and wherein n comprises from about 2 to about 10,000.

2. The method of claim 1 wherein R$_1$ comprises a C$_1$ to C$_{20}$ alkyl group.

3. The method of claim 1 wherein R$_1$ comprises an C$_1$ to C$_{20}$ O-alkyl group.

4. The method of claim 1 wherein R$_1$ comprises an C$_1$ to C$_{20}$ S-alkyl group.

5. The method of claim 1 wherein R$_1$ comprises a C$_6$ to C$_{20}$ aryl group.

6. The method of claim 1 wherein R$_2$ comprises hydrogen.

7. The method of claim 1 wherein the substituted thiophene monomer comprises either 2-bromo-5-chloro-3-hexylthiophene or 5-bromo-2-chloro-3-hexylthiophene.

8. The method of claim 1 wherein an equimolar amount of said magnesium metal is reacted with said substituted thiophene monomer.

9. The method of claim 1 wherein step b) further comprises combining said substituted thiophene monomer, magnesium metal and solvent with an organomagnesium Grignard reagent.

10. The method of claim 9 wherein a catalytic amount of from about 0.1% to about 10 mol % of said organomagnesium Grignard reagent is used.

11. The method of claim 9 wherein said organomagnesium Grignard reagent comprises tert-butyl magnesium chloride.

12. The method of claim 1 wherein said polymerization catalyst comprises a material selected from the group consisting of Ni (II), Ni (0), Pd(II) and Pd(0) compounds.

13. The method of claim 1 wherein said polymerization catalyst is selected from the group consisting of [1,3-bis(diphenylphosphino)propane]dichloronickel(II), nickel (II) acetylacetonate, 1,2-bis(diphenylphosphino)ethane nickel (II) chloride, dichlorobis(triphenylphosphine) palladium (II); complexes of nickel (II) acetylacetonate and tri-tert-butylphosphine, triadamantylphosphine, 1,3-bis(2,4,6-trimethylphenyl)imidazolium chloride, 1,3-bis(2,6-diisopropylphenyl), 1,3-bis(2,6-diisopropylphenyl)imidazolium chloride, 1,3,4-triphenyl-4,5-dihydro-1H-1,2,4-triazol-5-ylidene, 1,3-diadamantyl-imidazolium chloride, 1,3-bis(2,4,6-trimethylphenyl)-imidazolidinium chloride, 1,3-bis(2,6-diisopropylphenyl)-imidazolidinium chloride and suspensions and combinations thereof.

14. The method of claim 1 wherein said polymerization catalyst comprises a combination of a catalyst compound with an organomagnesium Grignard reagent.

15. The method of claim 1 wherein said polymerization catalyst comprises [1,3-bis(diphenylphosphino)propane] nickel (II) chloride.

16. The method of claim 1 wherein said polymerization catalyst comprises 1,2-bis(diphenylphosphino)ethane nickel (II) chloride.

17. The method of claim 1 wherein said polymerization catalyst comprises a complex of nickel (II) acetylacetonate and 1,3-bis(2,4,6-trimethylphenyl)imidazolium chloride.

18. The method of claim 1 which further comprises reacting said substituted polythiophene reaction product with a trialkylphosphite compound.

19. The method of claim 1 wherein the substituted polythiophene reaction product has a regioregularity of at least about 90%, a charge carrier mobility (μ) of at least about $1\times10^{-2}$ cm$^2$/Vs and an on/off ratio of at least about $1\times10^3$.

20. A method of forming a substituted polythiophene, comprising:

a) providing a solvent soluble, substituted thiophene monomer, wherein said monomer has the structure:

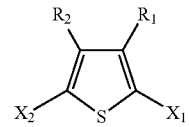

wherein X$_1$ and X$_2$ are different and each comprises a halogen atom, with at least one of the halogen atoms being capable of bonding with magnesium; R$_1$ comprises hydrogen; and R$_2$ comprises fluorine, NO$_2$ or a C$_1$ to C$_{20}$ alkyl group, a C$_1$ to C$_{20}$ F-alkyl group, a C$_1$ to C$_{20}$ O-alkyl group, a C$_1$ to C$_{20}$ S-alkyl group or a C$_6$ to C$_{20}$ aryl group;

b) combining the substituted thiophene monomer with magnesium metal and a methyl-tetrahydrofuran solvent to form a regiochemical intermediate; and c) reacting the regiochemical intermediate with a polymerization catalyst under conditions sufficient to polymerize the intermediate producing a regioregular, substituted polythiophene reaction product having repeating units of the structure:

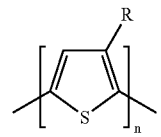

the polymer having a charge carrier mobility (μ) of at least about $1\times10^{-2}$ cm$^2$/Vs and an on/off ratio of at least about $1\times10^3$, and wherein n comprises from about 2 to about 10,000.

21. A method of forming a substituted polythiophene, comprising:

a) providing a solvent soluble, substituted thiophene monomer, wherein said monomer has the structure:

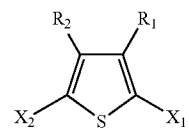

wherein X$_1$ and X$_2$ are different and each comprises a halogen atom, with at least one of the halogen atoms being capable of bonding with magnesium; R$_1$ comprises a C$_1$ to C$_{20}$ alkyl group, a C$_1$ to C$_{20}$ F-alkyl group, a C$_1$ to C$_{20}$ O-alkyl group, a C$_1$ to C$_{20}$ S-alkyl group, a C$_6$ to C$_{20}$ aryl group, fluorine or NO$_2$; and R$_2$ comprises hydrogen;

b) combining the substituted thiophene monomer with magnesium metal, a solvent and a tert-butyl magnesium chloride Grignard reagent to form a regiochemical intermediate; and c) reacting the regiochemical intermediate with a polymerization catalyst under conditions sufficient to polymerize the intermediate producing a regioregular, substituted polythiophene reaction product having repeating units of the structure:

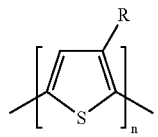

the polymer having a charge carrier mobility ($\mu$) of at least about $1 \times 10^{-2}$ cm$^2$/Vs and an on/off ratio of at least about $1 \times 10^3$, and wherein n comprises from about 2 to about 10,000.

22. A method of forming a substituted polythiophene, comprising:

a) providing a solvent soluble, substituted thiophene monomer, wherein said monomer has the structure:

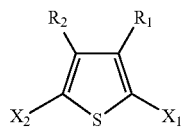

wherein $X_1$ and $X_2$ are different and each comprises a halogen atom, with at least one of the halogen atoms being capable of bonding with magnesium; $R_1$ comprises a $C_1$ to $C_{20}$ alkyl group, a $C_1$ to $C_{20}$ F-alkyl group, a $C_1$ to $C_{20}$ O-alkyl group, a $C_1$ to $C_{20}$ S-alkyl group, a $C_6$ to $C_{20}$ aryl group, fluorine or NO$_2$; and $R_2$ comprises hydrogen;

b) combining the substituted thiophene monomer with magnesium metal and a solvent to form a regiochemical intermediate; and c) reacting the regiochemical intermediate with a polymerization catalyst comprising a complex of nickel (II) acetylacetonate and 1,3-bis(2,4,6-trimethylphenyl)imidazolium chloride under conditions sufficient to polymerize the intermediate producing a regioregular, substituted polythiophene reaction product having repeating units of the structure:

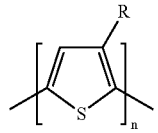

the polymer having a charge carrier mobility ($\mu$) of at least about $1 \times 10^{-2}$ cm$^2$/Vs and an on/off ratio of at least about $1 \times 10^3$, and wherein n comprises from about 2 to about 10,000.

23. A method of forming a substituted polythiophene, comprising:

a) providing a solvent soluble, substituted thiophene monomer, wherein said monomer has the structure:

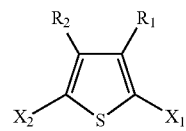

wherein $X_1$ and $X_2$ are different and each comprises a halogen atom, with at least one of the halogen atoms being capable of bonding with magnesium; $R_1$ comprises a $C_1$ to $C_{20}$ alkyl group, a $C_1$ to $C_{20}$ F-alkyl group, a $C_1$ to $C_{20}$ O-alkyl group, a $C_1$ to $C_{20}$ S-alkyl group, a $C_6$ to $C_{20}$ aryl group, fluorine or NO$_2$; and $R_2$ comprises hydrogen;

b) combining the substituted thiophene monomer with magnesium metal and a solvent to form a regiochemical intermediate; and c) reacting the regiochemical intermediate with a polymerization catalyst under conditions sufficient to polymerize the intermediate producing a regioregular, substituted polythiophene reaction product having repeating units of the structure:

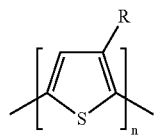

the polymer having a charge carrier mobility ($\mu$) of at least about $1 \times 10^{-2}$ cm$^2$/Vs and an on/off ratio of at least about $1 \times 10^3$, and wherein n comprises from about 2 to about 10,000; and further comprising reacting said substituted polythiophene reaction product with a trialkylphosphite compound.

* * * * *